Figure 1:
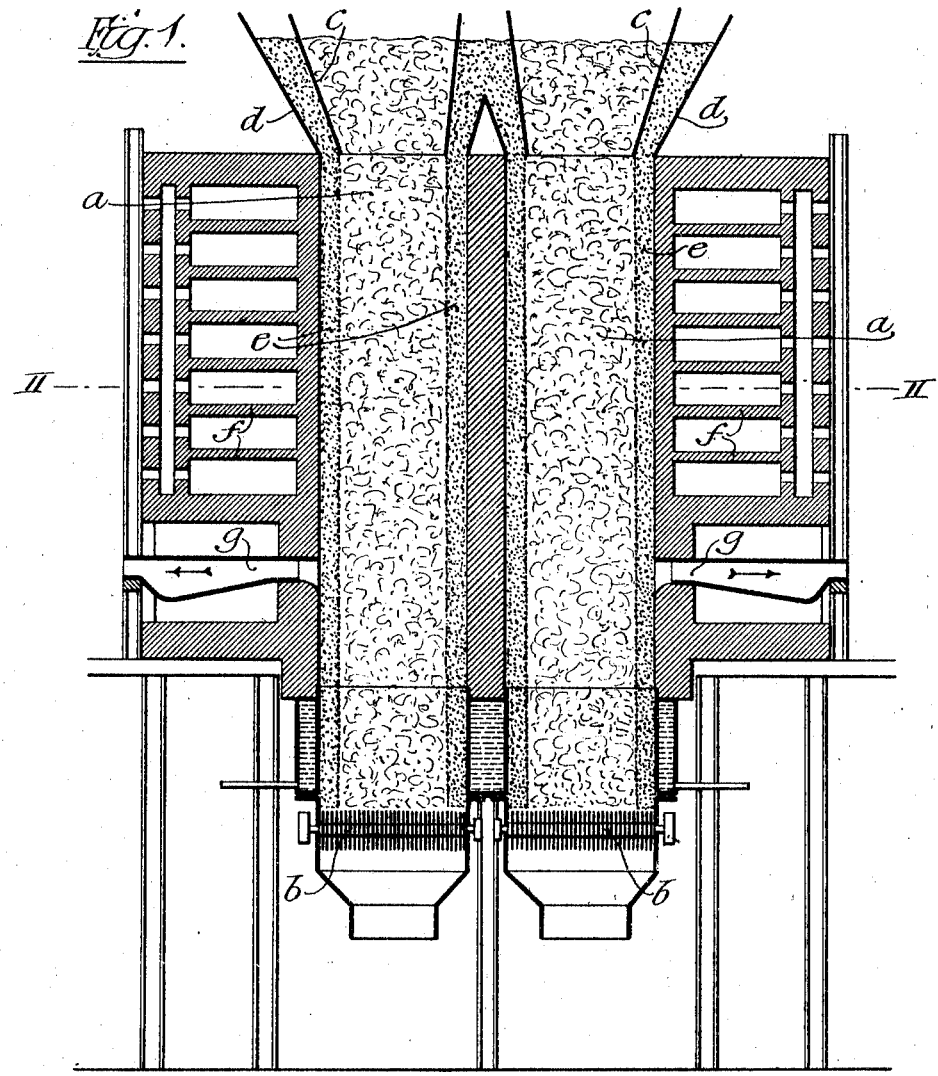

Jan. 15, 1924. 1,481,241
H. KOPPERS
DISTILLATION OF ZINC
Filed Aug. 31, 1921

Inventor:
Heinrich Koppers
By Munday, Clarke & Carpenter Attys.

Patented Jan. 15, 1924.

1,481,241

UNITED STATES PATENT OFFICE.

HEINRICH KOPPERS, OF ESSEN-RUHR, GERMANY, ASSIGNOR TO THE KOPPERS DEVELOPMENT CORPORATION, OF PITTSBURGH, PENNSYLVANIA, A CORPORATION OF PENNSYLVANIA.

DISTILLATION OF ZINC.

Application filed August 31, 1921. Serial No. 497,358.

*To all whom it may concern:*

Be it known that I, HEINRICH KOPPERS (assignor to The Koppers Development Corporation, a corporation of Pennsylvania), a citizen of Germany, residing in Essen-Ruhr, Germany, have invented a new and useful Improvement in the Distillation of Zinc (German application filed—to wit, June 7, 1916), of which the following is a specification.

The invention relates to a process for the distillation of zinc, having for its principal objects to do away with the use of the customary muffles, and to avoid losses due to the cracking and damage of such muffles, and also avoid slag adhesions to the retort or oven elements.

The customary procedure in the production of zinc is that the zinc ores are mixed with carbon particles, the so-called cinder, and subjected to distillation in muffles resembling gas retorts. Now it is found that in the muffles used for this purpose, which are made of fireproof clay, considerable slag adhesions occur, while the muffles easily and often crack. These disturbing influences not only are a prolific cause of losses in the zinc distillation, but the replacing of damaged muffles results in considerable expense and loss of time. These drawbacks are so important that in the construction and operation of a plant of this kind they are a factor to be given prime consideration.

These drawbacks are avoided by the invention thus: that the charge of the muffles, that is the mixture of ore and cinder, is separated from direct contact with the walls by a layer of carbon, that is, pure cinder, and, one might say, enveloped. This envelope, termed an insulating layer, not only accomplishes the task of preventing direct contact between the zinc ore and the walls whereby primarily slag adhesions are overcome, but also operates in such a way that the fire gases which enter the distillation space, owing to diffusion meet the distillation products only in reduced form so that oxidation of the zinc vapors which could be affected by either steam or carbonic acid is prevented. Within the scope of this guiding idea it is also of advantage to use for the muffles, instead of the heretofore adopted clay bonded material, a lime bonded so called Dinas material consisting almost entirely of silica, such Dinas material being well known to those skilled in the art, which not only can stand higher temperatures, but also is much less liable to cause slag adhesions.

The carrying out of the new mode of operation is preferably effected on the basis of the so-called continuous, that is uninterrupted, distillation, which has already been adopted with success in zinc distillation. Since in this case there is being handled the constantly arriving charge of ore and cinder and also constantly a charge of pure cinder, in the resulting state of inertia there is produced through the whole oven a progressive and constantly renewed lining formation without any difficulties to the normal operation being caused thereby.

Figure 2:
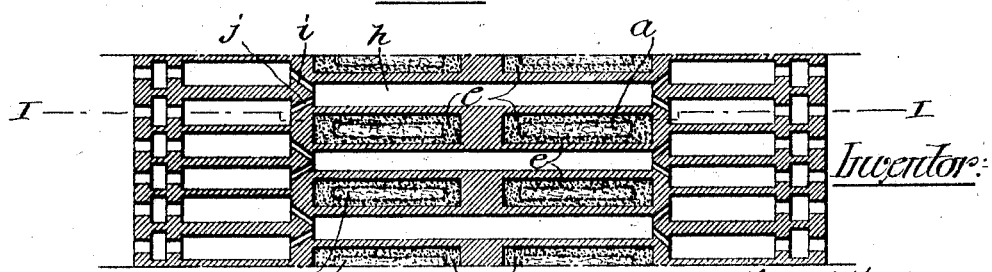

In the drawings a plant suitable for carrying out the indicated mode of operation is illustrated in Figures 1 and 2 in diagrammatic sections, Fig. 1 being a vertical section on line I—I of Figure 2; and Figure 2 being a horizontal section on line II—II of Figure 1, and showing only the central part of the apparatus.

The vertical retort $a$ may be of the known form used in shale oil distillation or continuous gas production, and is conveniently constructed of fireproof blocks united as in wall construction. In the base of the retort $a$ is arranged a movable discharge device or grate $b$ of any known and suitable construction adapted to the particular properties of the residue. At the top of the retort is provided the charging hopper $c$ by which the actual charge is admitted, while this hopper is surrounded by a second hopper $d$ containing only carbon particles, that is, pure cinder. Simultaneously with the descent of the charging column there is formed a lining $e$ enveloping the actual charge and insulating it from the wall of the retort $a$. The heating of the retort can be effected in one of the ways approved for hitherto known continously fed retorts, for example, it may be in the form of the so-called zone heating by forming by means of cooling walls having chambers $f$ a vertical series of zones which can be separately put into action and controlled. Intermediate the retorts $a$ are chambers or horizontal flues $h$ communicating with the chambers $f$ by conduits $i$, $j$ (Fig. 2). While, however, in gas generation this zone heating is guided by quite special considerations, for example, the coal charging region is especially strongly heated and the heating allowed to diminish downwardly, in the present case the action of the zones is so regulated that the pressures inside and outside the retort are practically equal, so that passage of gases through the retort walls is avoided as far as possible. The withdrawal of the products of distillation is conveniently effected at a region of the retort where a dropping of temperature is impossible, say at conduits $g$. The distillation gases developed are collected here, led away, and subjected to further treatment. As the gaseous oxides of carbon entrain zinc vapors, which are partly precipitated as zinc in solid or liquid form, the gases are purified from the metallic particles and reconducted to the retort, a part of the heating being accomplished by this, the said gases being combustible in the retort.

What is claimed is—

1. A process for the distillation of zinc from a mixture of zinc and carbon, consisting in continuously feeding said mixture through a heating retort, simultaneously feeding through said retort and around said mixture a layer of carbon, causing the heating of the contents of the retort to distill the zinc, withdrawing from said retort the gases of distillation containing the zinc, and withdrawing from the retort progressively the residue of its contents.

2. A process for the distillation of zinc from a mixture of zinc and carbon, consisting in continuously feeding said mixture through a heating retort, simultaneously feeding through said retort and around said mixture a layer of carbon, causing the heating of the contents of the retort to distill the zinc, withdrawing from said retort the gases of distillation containing the zinc, withdrawing from the retort progressively the residue of its contents, and regulating the heating and diminishing any passage of gases through the retort walls.

3. A process for the distillation of zinc from a mixture of zinc and carbon, consisting in continuously feeding said mixture by gravity down through a heating retort having walls of refractory material, maintaining said mixture out of contact with the walls of the retort as it passes through the same, causing the heating of the contents of the retort to distill the zinc, withdrawing from said retort the gases of distillation containing the zinc, and withdrawing from the retort progressively the residue of its contents.

4. In a process for the distillation of zinc and other volatile metals from their ores the steps that consist in enveloping the charge in carbon during the distillation period.

5. In a process for the distillation of volatile metals from their ores maintaining carbon about the charge while in the distillation chamber.

6. A process for the distillation of zinc from a mixture of zinc and carbon consisting in separating the charge from the retort walls by a layer of carbon.

7. A process for the distillation of zinc from a mixture of zinc and carbon consisting in separating the charge from the retort walls by a layer of cinder.

8. In a process for the distillation of volatile metals from their ores consisting in maintaining the charge in an envelope of carbon, reconducting the gases purified from metal particles to the retort to partially heat the charge.

9. A process for the distillation of zinc from a mixture of zinc and carbon consisting in continuously feeding to a retort a mixture of zinc and carbon and continuously feeding to the retort unmixed cinder to form a lining about said charge while passing through said retort.

10. A process for the distillation of volatile metals from their ores consisting of maintaining the charge being subjected to distillation out of contact with the walls of the distillation chamber.

11. A process for the distillation of zinc and other volatile metals from their ores consisting in continuously supplying to the retort a charge to be distilled and continuously supplying pure cinder to said retort between the charge to be distilled and the walls of the retort.

12. A process for the distillation of zinc from a mixture of zinc and carbon consisting in separating the charge to be distilled from the walls of the distilling chamber by carbonaceous material, regulating the heating of the different zones so that the pressure conditions will be substantially the same on the inside of the distilling chamber as on the outside of the distilling chamber.

13. A process for the distillation of zinc and other volatile metals from their ores consisting in continuously feeding the charge to be distilled through a retort whose walls are composed of lime bonded material such as the silicious refractory Dinas stone, separating the charge to be distilled from said retort walls by a lining of carbonaceous material.

In testimony whereof, I have hereunto set my hand this 26th day of July, 1921.

HEINRICH KOPPERS.